Oct. 18, 1938.  J. W. BICKEL  2,133,799
CIRCUIT CONTROL MEANS
Filed Nov. 29, 1935  2 Sheets-Sheet 1
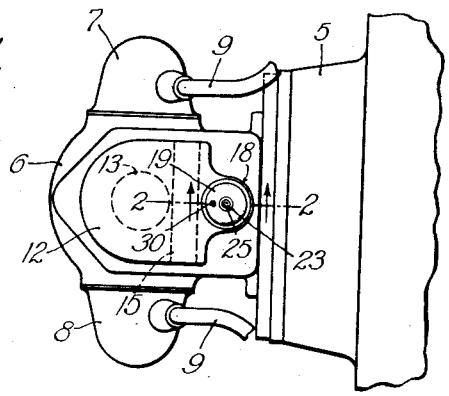
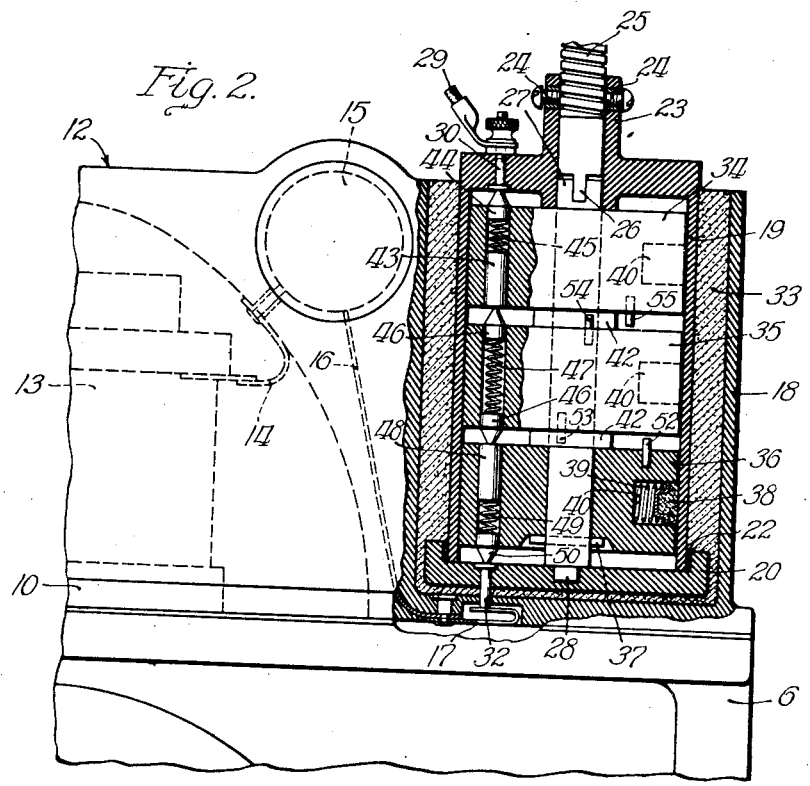
Inventor:
Joseph W. Bickel
By: Brown, Jackson, Boettcher & Dienner.
Attys.

Oct. 18, 1938.　　　　J. W. BICKEL　　　　2,133,799
CIRCUIT CONTROL MEANS
Filed Nov. 29, 1935　　　2 Sheets-Sheet 2

Inventor:
Joseph W. Bickel
By: Brown, Jackson, Boettcher & Dienner,
Attys.

Patented Oct. 18, 1938

2,133,799

UNITED STATES PATENT OFFICE 2,133,799

CIRCUIT CONTROL MEANS

Joseph W. Bickel, Niles Center, Ill.

Application November 29, 1935, Serial No. 52,016

5 Claims. (Cl. 123—146.5)

This invention relates to circuit control means, and more particularly as directed to circuit control means for use in connection with the ignition circuits of automotive vehicles and the like. Broadly, the present invention contemplates the provision of means for controlling the ignition circuit of an internal combustion engine or similar device by switch means disposed in the circuit between the incoming power conductor from a high tension coil or a source of current supply and a distributor contact.

The present invention, in its preferred embodiment, is directed to the provision of means for preventing the unauthorized completion of the ignition circuit through the distributor of an automobile or the like, to thereby prevent operation of the vehicle by anyone except the rightful owner. The disclosure constitutes a modification of the structure shown in my patent, No. 2,021,166, of November 19, 1935.

One object of the present invention is to provide a circuit controlling locking mechanism interposed in the connection between a high tension conductor leading from the induction coil, or from a source of power supply, and the center contact of the rotatable distributor arm.

Another object of the invention is the provision of remotely disposed operating means for actuating the circuit control means, in order to move it into a predetermined position for effecting closing of the ignition circuit, which preferably comprises a rotatable dialing mechanism similar to that used for a combination lock or the like. The operating means, when moved through a predetermined sequence or combination of movements, is adapted to position the circuit controlling means so as to effect completion of the ignition circuit for producing self-operation of the vehicle upon energization of the starting motor.

One of the advantages attained by the present construction is the provision of a locking mechanism capable of employing an infinite variety of combinations and sequences of movements to secure actuation thereof, whereby the same type of locking structure, with different actuating combinations, may be employed on any number of vehicles, each structure having an individual locking combination.

Another advantage secured by the present invention is the provision of a locking circuit control means of this type wherein no key or other instrumentality is necessary to the operation of the circuit controlling means, and the disadvantages inherent in key-operated devices are thus eliminated.

It is to be understood that the present invention is equally applicable to circuit control means other than employed in the ignition circuits of vehicles, the primary concept of the invention residing in the provision of a suitably controlled mechanism for preventing the closure of a circuit except by predetermined and authorized operation of a suitable circuit controlling mechanism.

Other objects and advantages of the present invention will appear more fully from the following detailed description which, taken in conjunction with the accompanying drawings, will disclose to those skilled in the art the particular construction and operation of a preferred form of my invention.

In the drawings:

Figure 1 is a top plan view of the circuit control means of my invention applied to a common type of automobile distributor;

Figure 2 is an elevational view of the structure shown in Figure 1, with a portion thereof being shown in section as taken on the line 2—2 of Figure 1;

Figure 3:
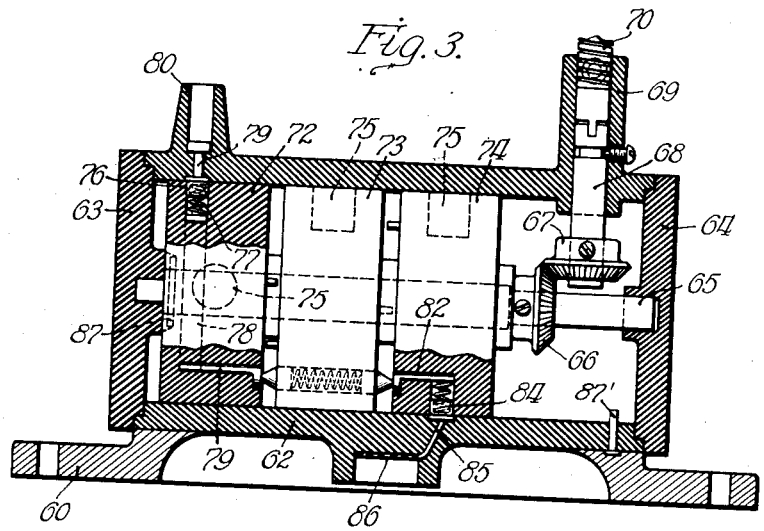
Figure 3 is a vertical sectional view through a modified form of structure.

Referring now to the drawings in detail, the structure shown in Figure 1 comprises an internal combustion engine or motor indicated at 5, which has secured thereto the distributor housing 6 having oppositely mounted distributor caps 7 and 8 provided with a suitable outlet cable 9 leading to the spark plugs of the vehicle. The distributor housing 6, as shown in Figure 2, is provided with a cap member 10 mounted on the upper surface thereof, which cap member is provided with an integrally formed housing portion 12 having therein a high tension induction coil indicated diagrammatically at 13.

The induction coil 13, as shown, is provided with a terminal conductor 14 leading to a condenser 15 mounted in an integral part of the housing 12. From the condenser 15, a suitable terminal conductor 16 is extended rearwardly of the housing 12 to a contact terminal 17 disposed substantially in the plane of the plate 10 which is formed integral with the housing 12.

The plate 10 and housing 12 are preferably formed of insulating material, such as a molded phenol condensation product, molded rubber, or a fibrous material. The housing 12, at its rear portion, is provided with a cylindrical vertically extending socket portion 18 which is adapted to receive the housing 19 carrying the circuit controlling mechanism. The housing 19, which is cylindrical in shape, is also preferably formed of insulating material, and at its lower end is closed by the cap member 20, which member is sealed thereto to form an oil-tight casing, suitable cementitious material 22 being provided for this purpose. The interior of the housing is preferably filled with insulating oil in case a high tension current is passed therethrough, although in this specific embodiment of the invention herein disclosed the circuit controlling means is placed anterior to the high tension coil 13 and does not necessarily have to be so insulated.

At its upper end, the housing 19 is provided with an extending boss portion 23 having suitable screw means 24 securing the end of a flexible control member 25 thereto. The member 25 may be a flexible motion-transmitting member, such as a "Bowden" wire or the like, and at its end is provided with an extending tongue member 26 which fits into a suitable slot formed in the upper end of the control shaft 27 of the circuit-controlling mechanism. The lower end of the shaft 27 is journaled, as indicated at 28, in the inner surface of the cap member 20.

The circuit from the source of current supply is led to the circuit controlling mechanism through the conductor 29, and through the terminal 30 connected thereto into the interior of the housing 19. The cap member 20 is provided with the terminal 32 which extends therethrough and projects therefrom into contacting engagement with the terminal member 17 of the conductor 16 leading to the condenser 15. The housing 19 and cap member 20 are sealed in position within the cylindrical socket 18 by means of insulating compound which is poured thereinto and which subsequently hardens to hold the housing 19 in fixed position. This compound is indicated at 33.

Within the housing 19 the shaft is provided with a plurality of cylindrical block members 34, 35 and 36, each formed of insulating material, the blocks 34 and 35 being freely rotatable with respect to the shaft 27, while the block 36 is secured for conjoint rotation with the shaft 27 by means of the key 37.

Each of the blocks 34, 35 and 36 is provided with a plurality of radially extending cushioning members comprising felt pads 38 which are normally pressed into frictional engagement with the inner surface of the housing 19 by means of the springs 39 carried in suitable recesses 40 extending radially inwardly of the blocks. The cushioning members 38 serve to maintain the blocks 34 and 35 in fixed position with respect to the housing 19 upon rotation of the shaft 27, except as hereinafter described.

The blocks 34, 35 and 36 are preferably separated by suitable spacing members 42 which serve to hold the blocks a predetermined distance apart and which are mounted concentrically with the shaft 27.

The block 34 is provided with a fixed terminal stud 43 extending partially therethrough, and at its upper surface this block is provided with a spring-pressed cap member 44 normally urged outwardly of the block by the spring 45, which member 44 is adapted to have contacting engagement with the inner surface of the terminal 30 when the block 34 has been rotated into position to align the members 30 and 44 axially of the housing 19. The block 35 is provided with two spring cap members 46 normally urged outwardly of the top and bottom surfaces of the block 35 by means of the confined spring member 47. When the block 35 has been rotated into proper position in alignment with the terminal stud 43, the upper cap member 46 makes contact with the surface of the stud 43 lying in the plane of the bottom surface of the block 34, and this contact is transmitted through the spring 47 and the lower cap member 46 to a terminal stud 48 secured in the top surface of the block member 36 which, at its inner end, receives the spring 49 normally urging the cap member 50 outwardly of the bottom surface of the block member 36. The cap member 50, when properly aligned in position, makes contact between the lower cap member 46 of the block 35 through the terminal stud 48 and spring 49, with the terminal 32 engaging the contact 17 leading through conductor 16 to the condenser 15. Thus, when the blocks 34, 35 and 36 have been rotated within the housing 19 into a predetermined position, a continuous contact engagement is effected between the terminal studs 30 and 32 through the contact means carried by each of the block members. Thus a circuit is completed between the conductor 29 and the conductor 16, completing the ignition circuit to the high tension coil 13 mounted directly over the distributor contained within the housing 6.

Rotation of the block is effected by corresponding rotation of the shaft 27. For initial operation, the shaft 27 is rotated approximately between one and two revolutions, which causes contacting engagement between the pins 52 and 53 carried by the upper surface of the block 36 and the lower surface of the block 35, respectively, and between pins 54 and 55, carried by the upper surface of the block 35 and the lower surface of the block 34, respectively. This results in conjoint rotation of all of the blocks 34, 35 and 36. Rotation of these blocks is effective to produce a predetermined positioning of the block 34 so that the contact cap 44 thereof is in alignment with and engages the surface of the terminal stud 30. The shaft 27 is then rotated, through the flexible motion-transmitting mechanism, in the opposite direction for more than one revolution, which results in reverse rotation of the block 35, while not affecting the position of the block 34 which is held in fixed position by the frictional engagement of the pads 38 with the inner surface of the housing 19. The block 35 is then rotated into a position such that contact is effected between the upper cap member 46 and the surface of the terminal stud 43 carried by the block 34. The shaft is then again reversed in rotation and the block 36 is brought into position to produce alignment of the contact 48 with the contact cap 46, completing the circuit between the contact terminals 30 and 32. It is apparent that by the circumferential spacing of the conducting means extending through each of the block members, and the angular displacement of the contact studs 30 and 32, an infinite number of combinations of movements and sequences of operation may be provided with the same structure, and consequently the same type of locking structure, with different actuating combinations, may be employed for any number of vehicles, each of the structures having an individual locking combination.

It is obvious that other than the flexible motion transmitting member 25 may be provided for effecting rotation of the shaft 27, such as the provision of straight shafts with universal joints therebetween. Also, it is apparent that at the opposite end of the motion-transmitting member 25 there will be provided suitable dial mechanism with a pointer or indicator for indicating to the operator of the vehicle the particular positioning required, similar to the mechanism provided for other combination locking devices employing a predetermined sequence of movement. Such a dial or indicating mechanism is disclosed in my patent, No. 2,021,166, of November 19, 1935.

Figure 4:
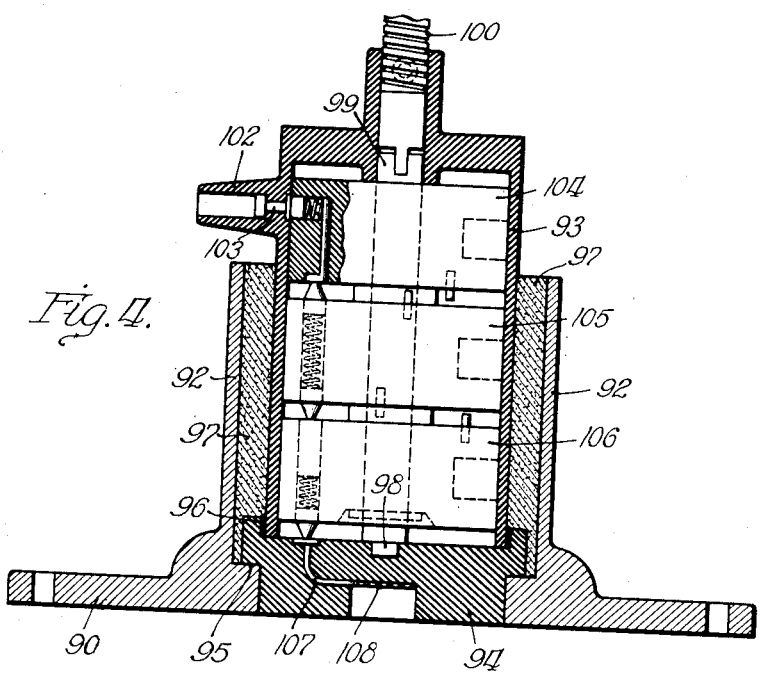
Figure 4 is a vertical sectional view through a still further modified form of construction.

Referring now to the structure shown in Figures 3 and 4, it will be apparent that the structures are similar to the structure disclosed in Figure 1, except that the positioning of the circuit controlling mechanism is varied to accommodate it to different types of generator structures, or to different assemblies of the structure. Also, the structures shown in Figures 3 and 4 are provided for interposition between the high tension coil of the ignition circuit and the distributor, and hence must be properly insulated in order to pass the high tension current therethrough. Thus these structures must be so designed as to carry sufficient insulating oil or the like providing for passage of such high tension current therethrough.

Referring now in more detail to Figure 3, I provide a cap member 60, corresponding to the cap member 10 of the embodiment shown in Figures 1 and 2, which is adapted to be bolted or otherwise suitably secured to a distributor or the like. This cap member is provided with a suitable arcuately formed channel in the upper surface thereof receiving the horizontally extending cylindrical housing 62, which housing is adapted to contain the circuit controlling mechanism. The housing comprises a cylindrical portion closed at its ends by the cap members 63 and 64, these members being provided with suitable bosses for journaling a shaft 65 for rotation axially of the housing. The shaft 65 is provided with a bevel gear 66 secured thereto, which is driven by a second bevel gear 67 secured to a normally extending shaft 68 projecting out through the boss 69 in the lateral surface of the housing 62, and connected at its outer end to a flexible motion-transmitting member 70, whereby rotation of shaft 68 in turn produces corresponding rotation of shaft 65 through the gears 67 and 66.

The housing 62 is preferably filled with insulating oil, and is provided with three cylindrical block members 72, 73 and 74, each of which is provided with a plurality of circumferentially spaced recesses 75 carrying suitable friction gripping means normally urged outwardly into engagement with the internal surface of the housing 62, as described in connection with the friction pads 38 of the structure shown in Figure 2. The block 72 is provided with a radially extending contact cap 76 normally urged outwardly by the spring 77, which spring is connected through the stud 78 to an axially extending contact terminal 79 extending to the surface of the block 72 at one side thereof. The contact cap 76 is adapted, in a predetermined position of the block 72, to engage the contact stud 79 connected through the terminal 80 to a high tension conductor leading from a high tension coil toward the distributor. The central block member 73 of the mechanism is similar to the block member 35 of the structure shown in Figure 2, and needs no further description. The block member 74 is provided with a contact stud 82 engaged by the resilient contact carried by the block 73, when in aligned position therewith, and having a radially directed contact cap 84 which is normally urged outwardly into contacting engagement with the internal surface of the housing 62, whereby in predetermined position this cap 84 has contact with a terminal stud 85 extending inwardly of the plate 60, as indicated at 86, for connection to the distributor contact.

The blocks 72, 73 and 74 are provided with cooperating pins extending from adjacent surfaces thereof for producing conjoint rotation of these blocks upon continued rotation of the shaft 65 in one direction, as previously described. The block 72 is preferably secured by means of the key 87 for conjoint rotation with the shaft 65 at all times, although it is obvious that any one of the blocks may be so secured.

In order to prevent filling of the housing with mercury or the like to short the switch, I provide a ground terminal 87' extending into the housing and grounded on the metal plate 60. This prevents any possibility of by-passing the switch internally. Obviously such a feature can be applied to all the disclosed forms of the invention.

Referring now to the structure shown in Figure 4, the circuit controlling mechanism in this embodiment is mounted in upright position on a cap member 90 which is secured over a distributor or the like. The cap member 90 has formed integrally therewith vertically extending cylindrical socket 92 which is adapted to receive the cylindrical housing 93 enclosing the circuit controlling mechanism, the lower end of the housing 93 being closed by a cap member 94 having piloted engagement with a shoulder 95 formed in the base portion of the socket 92, whereby the housing 93 is guided within this socket. The cap member 94 is sealed to the open end of the housing 93, as indicated at 96, and is preferably formed of insulating material, as is the housing 93. Suitable insulating compound 97 is poured into the socket 92 about the housing 93 in order to seal the same in position.

The cap member 94 provides a suitable journal for the lower end 98 of a shaft 99 rotatably mounted within the housing 93 and connected at its upper end to a flexible motion-transmitting member 100, as described in connection with the embodiment shown in Figure 2.

A suitable high tension terminal 102 is provided extending laterally outwardly of the housing 93, corresponding to the terminal 80 of Figure 3, through which current is led from a high tension coil to contact stud 103. Cylindrical block members 104, 105 and 106 are provided, corresponding to the block members 34, 35 and 36 of Figure 2, or the block members 72 to 74, inclusive, of Figure 3. The block member 104 is substantially identical in construction with the block member 72 of Figure 3, and it is not believed necessary to describe the same in detail. Block member 105 corresponds to block member 35 of Figure 2 or block member 73 of Figure 3, and it is not believed necessary to describe the same in detail. The block member 106 corresponds to the block member 36 of Figure 2, and provides for completion of a circuit from the contact stud 103 through the block members to the contact stud 107 connected through the contact-engaging surface 108 to any suitable distributor contact member, whereby current is led in laterally of the housing 93, and is led out from this housing through the circuit controlling mechanism in an axial direction.

In the structure shown in Figure 3, the current is led into the housing from adjacent one end thereof through the lateral side of the housing, and is led out from the lateral surface of the housing adjacent the opposite end thereof. In the embodiment shown in Figure 2, current is led into the housing axially at one end thereof, and is led out from the housing axially at the opposite end thereof. It is therefore apparent that the present invention is capable of use in a multiplicity of situations, namely, wherever it is desired to interpose a circuit-controlling locking mechanism between two points in an ignition circuit or the like, and the mechanism itself is capable of connection in the circuit in any desired manner. Completion of the circuit is effected, as described hereinbefore, by rotation of the shaft carrying the cylindrical block members in a predetermined sequence of movements which result in final alignment of these block members in position. By changing the angular position of the pins carried by the adjacent surfaces of the block members, or by changing the position of the block member which is keyed to the shaft, it is possible to produce an infinite variety of combinations of movement necessary to effect completion of the circuit, and consequently the same structure, with variations in the positioning of either the contacting portions of the cylindrical blocks, the positioning of the contact studs with which these blocks engage, or the positioning of the abutment members which effect rotation of the blocks, will produce any desired sequence of movement necessary to effect alignment of the contacting portions between the inlet and outlet terminals of the circuit controlling mechanism.

It is therefore believed apparent that I have provided a circuit controlling mechanism for installation in any circuit in which it is desired to prevent unauthorized operation by completion of the circuit, and in which no key-controlled mechanism or the like is required. Further, substantially the same fundamental construction can be provided for an infinite number of different circuits, each one being individual with respect to all other similar constructions. It is also believed obvious that the present invention is not restricted to use only with a distributor or the like, but may be placed in any part of the ignition circuit, or may be used for controlling other than ignition circuits entirely.

I am aware that various changes and modifications may be made in the present construction without departing from the scope and spirit thereof, and I therefore intend to limit myself only as defined by the appended claims.

I claim:

1. Circuit controlling means of the class described comprising an insulating housing having a cylindrical passage therein, a shaft extending axially of said passage, a plurality of insulating cylindrical blocks mounted on said shaft within said passage, one of said blocks being fixed for conjoint rotation with said shaft, means engaging between said blocks for effecting selective rotation thereof upon rotation of said one block, spaced contact means extending into said housing adjacent opposite ends thereof, means carried by said blocks for completing a circuit between said contacts upon predetermined selective rotation of each of said blocks, and means for grounding said circuit controlling mechanism upon filling of said housing with current conducting fluid.

2. In combination, a distributor, a closure plate therefor having a housing containing a high tension coil, a condenser carried by said housing, a vertically extending socket carried by said plate, circuit controlling mechanism disposed in said socket in spaced relation to the defining surfaces thereof, cementing means securing said mechanism rigidly in said housing, a conductor extending from said condenser to said socket, means for supplying current to said mechanism, and means within said mechanism movable through a predetermined sequence of operation to complete a circuit between said supply means and said conductor.

3. Circuit controlling mechanism comprising a housing having a cylindrical passage therein, a shaft extending axially therethrough, a plurality of cylindrical blocks mounted in superposed position about said shaft within said passage, one of said blocks being keyed to said shaft means for producing predetermined selective rotation of said blocks upon rotation of said shaft, a terminal stud extending into the lateral surface of said passage and engaging the lateral surface of one of said blocks, a terminal stud extending axially into one end of said passage, and means carried by said blocks for completing a circuit between said studs upon said predetermined selective rotation of said blocks.

4. The combination with a distributor closure plate having an integrally formed cylindrical socket projecting therefrom and provided with an opening in its base for reception of a terminal conductor, of a housing formed of a cup-shaped insulating member and an insulating closure cap therefor, said cap containing a terminal stud adapted for connection to said terminal conductor, means surrounding the lateral surfaces of said housing cementing said housing in said socket, a second terminal stud extending into said cup-shaped member, a shaft projecting axially through said housing and journaled at one end in said cap, and means in said housing controlled by predeteremined rotation of said shaft for completing a circuit between said studs.

5. A contact block for a circuit controlling mechanism of the combination switch type, comprising a cylindrical block of insulating material, means extending axially through said block at a point spaced radially from the center thereof for completing a circuit between the opposite end faces of said block, a pin carried in one face of said block and spaced circumferentially from said means, a radially inwardly extending recess in the lateral surface of said block, a spring in said recess, and friction material carried in said recess and normally urged outwardly thereof by said spring.

JOSEPH W. BICKEL.